US006486793B1

(12) United States Patent
Buccola

(10) Patent No.: US 6,486,793 B1
(45) Date of Patent: Nov. 26, 2002

(54) WIRELESS MAGNETIC LOCK CONTROL SYSTEM

(75) Inventor: Charles S. Buccola, Valley Stream, NY (US)

(73) Assignee: Alarm Lock Systems, Inc., Amityville, NY (US)

( * ) Notice: Subject to any disclaimer, the term of this patent is extended or adjusted under 35 U.S.C. 154(b) by 0 days.

(21) Appl. No.: 09/433,945

(22) Filed: Oct. 25, 1999

(51) Int. Cl.[7] .................................................. G06F 7/04

(52) U.S. Cl. .............................. 340/825.31; 292/251.5; 292/144; 292/1.5; 70/278.3; 70/279.1; 340/506; 340/3.1; 340/825.31

(58) Field of Search .............................. 292/251.5, 144, 292/1.5; 70/278.3, 279.1; 409/6; 318/16; 340/506, 539, 825.31, 3.1

(56) References Cited

U.S. PATENT DOCUMENTS

| | | | |
|---|---|---|---|
| 2,601,775 A | | 7/1952 | Jewett et al. |
| 3,126,218 A | | 3/1964 | Andrews |
| 4,034,437 A | | 7/1977 | Robertson et al. |
| 4,080,594 A | | 3/1978 | Plevy |
| 4,123,748 A | | 10/1978 | Otani |
| 4,257,631 A | | 3/1981 | Logan, Jr. |
| 4,573,046 A | | 2/1986 | Pinnow |
| 4,639,902 A | | 1/1987 | Leverance et al. |
| 4,652,028 A | | 3/1987 | Logan et al. |
| 4,652,862 A | | 3/1987 | Verslycken |
| 4,665,397 A | | 5/1987 | Pinnon |
| 4,763,937 A | | 8/1988 | Sittnick, Jr. et al. |
| 4,868,559 A | | 9/1989 | Pinnow |
| 4,893,852 A | | 1/1990 | Harris et al. |
| 4,931,789 A | | 6/1990 | Pinnow |
| 4,942,747 A | | 7/1990 | Pinnow |
| 5,070,442 A | | 12/1991 | Syyon-Townson et al. |
| 5,132,661 A | | 7/1992 | Pinnow |
| 5,386,713 A | | 2/1995 | Wilson |
| RE35,268 E | | 6/1996 | Frolov et al. |
| 5,537,102 A | | 7/1996 | Pinnow |
| 5,848,541 A | | 12/1998 | Glick et al. |
| 5,941,106 A | * | 8/1999 | Williamson et al. ....... 70/278.1 |

* cited by examiner

*Primary Examiner*—Daryl Pope
(74) *Attorney, Agent, or Firm*—John R. Mugno

(57) ABSTRACT

A two-point locking system for providing controlled access through a doorway is described comprising a controlled deadlatch assembly and a magnetic lock assembly. The controlled deadlatch assembly comprises (i) a deadlatch for selectively latching and unlatching a door, (ii) an input control device for selectively controlling the deadlatch, and (iii) a first wireless transmitter for transmitting a magnetic lock control signal. The magnetic lock assembly comprises (i) a metal housing unit, (ii) an armature plate, (iii) an electromagnetic element coupled to the housing unit and aligned to magnetically engage with the armature plate when selectively electrically energized, and (iv) a wireless receiver capable of receiving the magnetic lock control signal from the wireless transmitter. The magnetic lock control signal will typically disengage the magnetic lock assembly when the controlled deadlatch assembly is unlatched (thus unlocking the door and allowing access) and engage the magnetic lock assembly when the controlled deadlatch assembly is latched (thus locking the door and not allowing access). A second wireless transmitter can also be added to the magnetic lock assembly to communicate to a second wireless receiver at the controlled deadlatch assembly to provide two-way wireless communication between the two locking points.

21 Claims, 4 Drawing Sheets

WIRELESS MAGNETIC LOCK CONTROL SYSTEM

FIELD OF THE INVENTION

This invention is generally directed to an access door locking system including a magnetic lock. More specifically, the access system of the present invention utilizes a two-point locking system integrating a deadlatch and a magnetic lock in a manner requiring no wiring between the controlled deadlatch assembly (typically located by the door handle) and the magnetic lock assembly (typically incorporated along the top of a door frame).

BACKGROUND OF THE INVENTION

There exists in the prior art a myriad of deadlatches and magnetic locks in the prior art to control ingress and egress through a door. Additionally, there are numerous integrated or so called two-point systems which incorporate both a controlled deadlatch assembly and a magnetic lock assembly. One common example is a controlled deadlatch activated by a panic bar which not only will release the deadlatch but also send an electrical signal through wiring that will release a magnetic lock. In such an example, an alarm might also be activated.

While the actual operation of properly installed two-point locking systems has proven to be relatively effective, installation has proven both difficult and time-consuming. Due to the space constraints of the door frame, the hard wiring between the knob assembly (where the controlled deadlatch assembly is typically located) and the magnetic lock assembly (which is typically coupled to the top of the door) is often difficult and can result in improper connections or actual physical damage to the door. Furthermore, it is often easy to tamper with such wiring.

In either single point magnetic locking devices or two-point locking systems, any of a number of input control devices can be incorporated. Conventional control devices include keypads, card swipes, proximity card readers, push buttons, passive infrared detectors, retinal scanners, fingerprint detectors, etc. However, whether in single point or two-point locking systems, and regardless of the type of control device (or the attached deadlatch assembly) utilized, the prior art requires the installation of proper wiring between the input control device and the remotely located magnetic lock assembly. Again, expensive and difficult installing is required. Additionally, lock installers typically are mainly mechanically skilled thus requiring a second installer with electrical skills.

In addition to the difficulty encountered by installers of conventional magnetic locks which require hard wiring between the control device and a magnetic lock, it has been shown that consumers have been reluctant to incorporate lock systems which require significant installation through a door frame, particularly in retrofit applications. Thus, the proliferation of magnetic locks has proven difficult.

It is, therefore, a primary object of the present invention to provide a new and improved magnetic locking system to control door access and egress.

It is another object of the present invention to provide a new and improved magnetic locking system to control door access and egress in either single point or two-point applications.

It is yet a further object of the present invention to provide a new and improved magnetic locking system to control door access and egress which requires no hard wiring between an input control device and the magnetic lock assembly.

It is yet another object of the present invention to provide a new and improved magnetic locking system to control door access and egress which provides easy adaptability of a plurality of access applications.

It is still another object of the present invention to provide a new and improved magnetic locking system to control door access and egress which provides detailed audit trail information over an infrared link.

It is yet an additional object of the present invention to provide a new and improved magnetic locking system to control door access and egress in which additional infrared transmitters may be incorporated in order to expand the range for activating a control device.

It is yet still another object of the present invention to provide a new and improved magnetic locking system to control door access and egress in which a remotely located user can permit or deny access or egress from the protected premises.

Other objects and advantages of the present invention will become apparent from the specification and the drawings.

SUMMARY OF THE INVENTION

Briefly stated and in accordance with the preferred embodiment of the present invention, a two-point locking system for providing controlled access through a doorway is described comprising a controlled deadlatch assembly and a magnetic lock assembly. The controlled deadlatch assembly comprises (i) a deadlatch for selectively latching and unlatching a door, (ii) an input control device for selectively controlling the deadlatch, and (iii) a first wireless transmitter for transmitting a magnetic lock control signal. The magnetic lock assembly comprises (i) a metal housing unit, (ii) an armature plate, (iii) an electromagnetic element coupled to the housing unit and aligned to magnetically engage with the armature plate when selectively electrically energized, and (iv) a wireless receiver capable of receiving the magnetic lock control signal from the wireless transmitter. The magnetic lock control signal will typically disengage the magnetic lock assembly when the controlled deadlatch assembly is unlatched (thus unlocking the door and allowing access) and engage the magnetic lock assembly when the controlled deadlatch assembly is latched (thus locking the door and not allowing access). A second wireless transmitter can also be added to the magnetic lock assembly to communicate to a second wireless receiver at the controlled deadlatch assembly to provide two-way wireless communication between the two locking points.

BRIEF DESCRIPTION OF THE DRAWINGS

While the specification concludes with claims particularly pointing out and distinctly claiming the subject matter regarded as the invention herein, it is believed that the present invention will be more readily understood upon consideration of the description, taken in conjunction with the accompanying drawings, wherein:

DESCRIPTION OF THE PREFERRED EMBODIMENT

Figure 1:
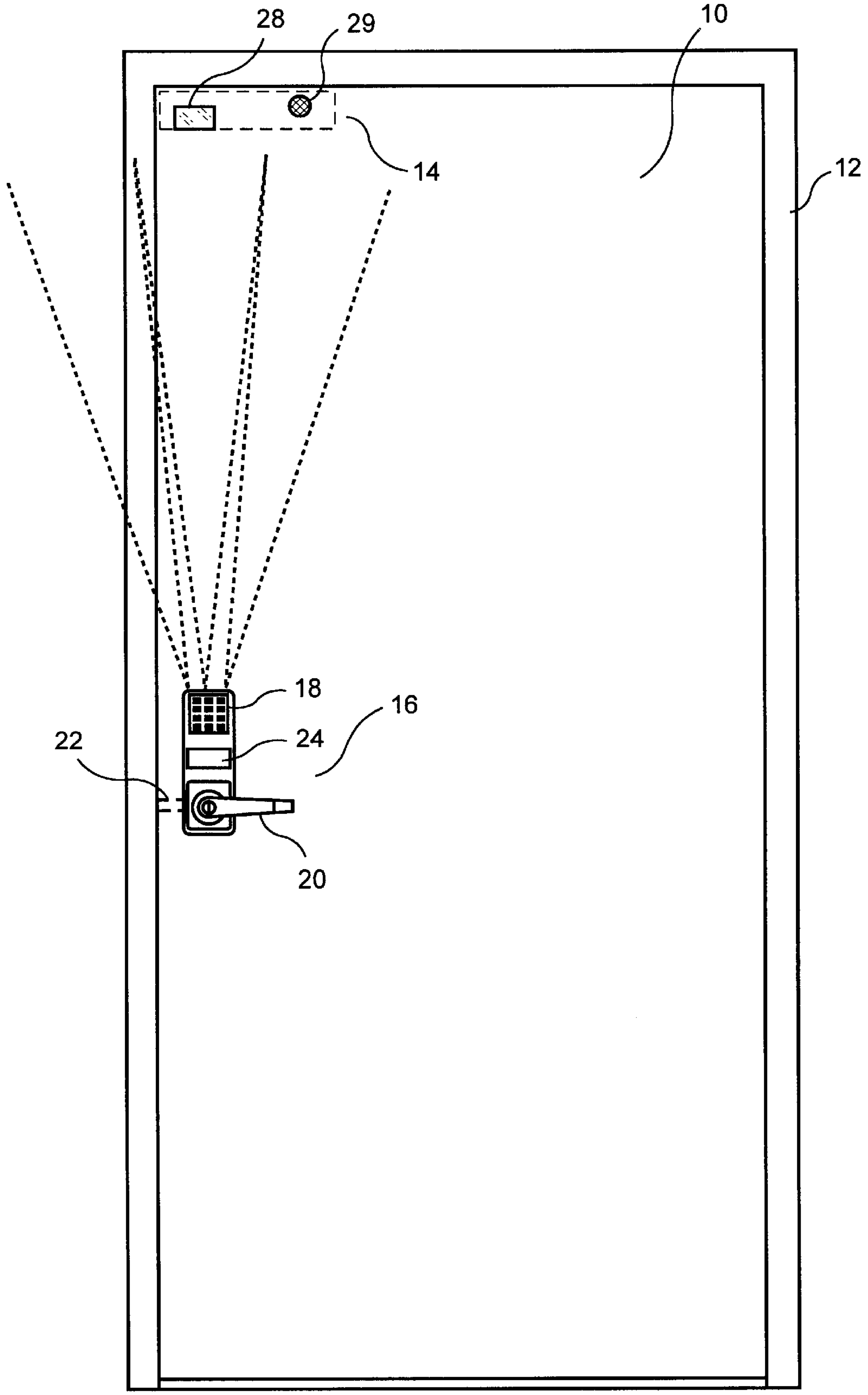
FIG. 1 is a schematic illustration of the outside of a door incorporating a magnetic locking system in accordance with the present invention.
Figure 2:
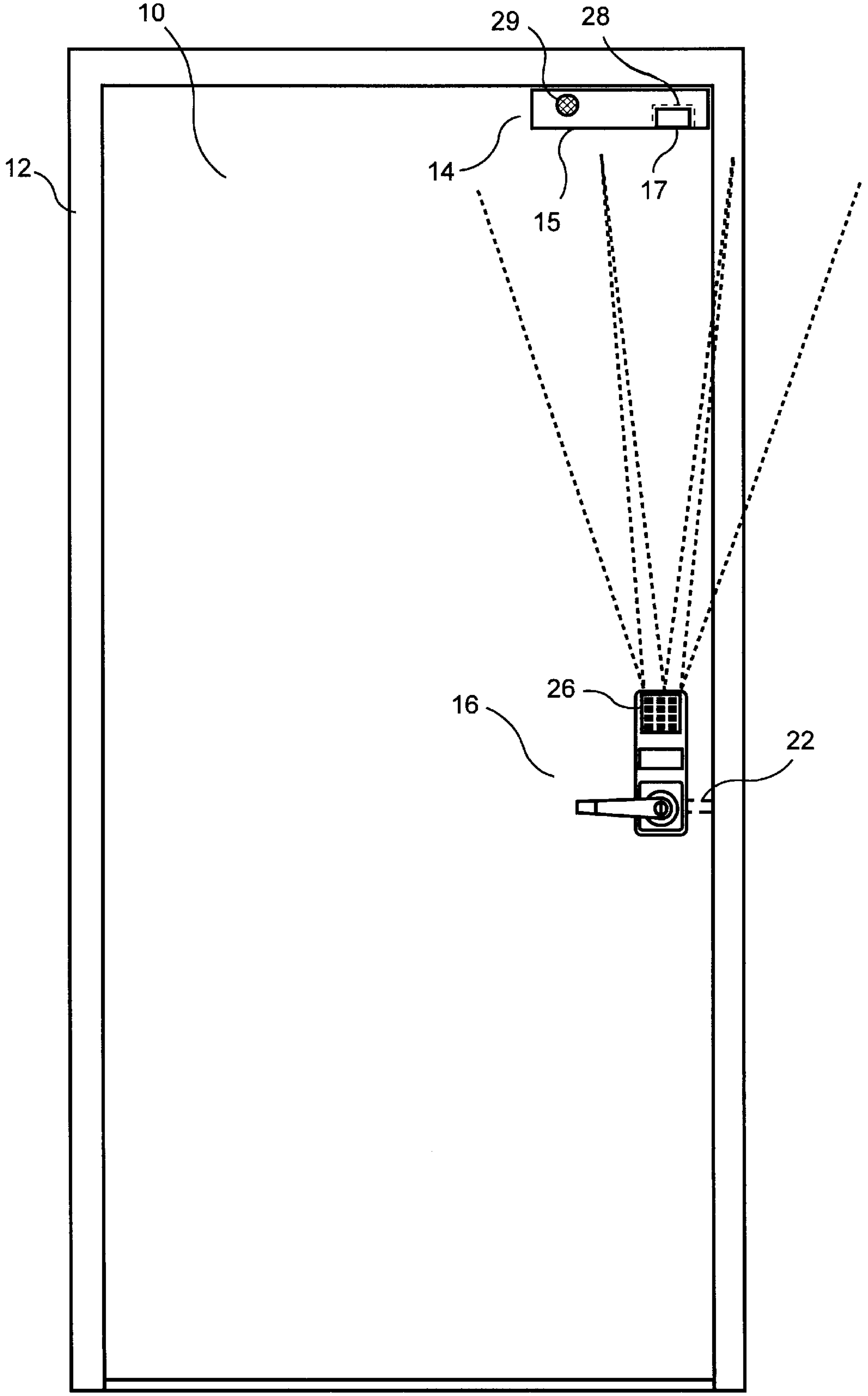
FIG. 2 is a schematic illustration of the inside of a door incorporating the magnetic locking system in accordance with the present invention.

Both FIG. 1 and FIG. 2 include a door 10, a door frame 12, a magnetic lock assembly 14, and a controlled deadlatch assembly 16. FIG. 1 represents the outside of door 10 whereas FIG. 2 represents the inside of door 10. Magnetic lock assembly 14 is shown in shadow in FIG. 1 since it is preferred in most applications to have magnetic lock assembly 14 installed on the inside (or secured side) of door 10 for security purposes. However, magnetic lock assembly 14 obviously can be attached to either side of door 10 and door frame 12.

Controlled deadlatch assembly 16, as depicted in FIG. 1 and FIG. 2, actually is a combination input control device and deadlatch/door handle apparatus. In the embodiment shown, a keypad 18 is incorporated as the input control device. If an acceptable combination is punched into keypad 18, a predetermined delay time will commence in which a user can turn a door handle 20 to release a deadlatch 22 and permit entry into the secured premises. Keypad 20 can be replaced with a card swipe reader, a proximity card reader, a wireless receiver, or any other available input control device to release deadlatch 22. Furthermore, in certain applications, door handle 20 need not be activated at all and instead a motor can automatically lock or unlock deadlatch 22. Moreover, controlled deadlatch assembly 16 can incorporate a liquid crystal display (LCD) 24 such as shown in FIG. 1, a light emitting diode (LED), and/or a buzzer to indicate to a user that a proper code has been entered or to provide other user indicia. The type of controlled deadlatch assembly incorporated while developing the present invention was the DL 2700 manufactured by the assignee of the present invention.

Magnetic lock assembly 14 includes a housing 15 which is typically comprised of a tamper proof metal. Housing 15 is, in the preferred embodiment, securely coupled to door frame 12. Thus, in actuality, housing 15 would not appear visible in FIG. 2 if door 10 were shut. On the outward facing portion of housing 15 is an electromagnetic element 17 which is capable of mating with an armature plate 19 that is appropriately positioned on door 10. Upon electrical energization of electromagnetic element 17, armature plate 19 is electromagnetically bonded to electromagnetic element 17 and hence metal housing 15. Electromagnetic element 17 and armature plate 19 have generally complimentary contact surfaces. Armature plate 19 is therefore mounted to the upper corner of door 10 so that armature plate 19 and electromagnetic element 17 align and are in mutual surface-to-surface contact when door 10 is in the closed latched position. Various combinations and components of magnetic lock assemblies are well known in the art. For instance, it is possible to move housing 15 to door 10 and armature plate 19 to door frame 12.

Referring to FIG. 2, a keypad 26 is illustrated which also requires proper entry by a user to exit the premises protected by door 10. An exit input control device, such as keypad 26, is typically incorporated in high security applications such as airports, vaults, etc. Many applications do not require the use of an input control device on the inside of the protected premises (i.e., to protect egress). However, it is typical to place a power supply on the inside of the door for security purposes. Again, reference is made to the DL 2700 manufactured by Alarm Lock Systems, Inc. and numerous other controlled deadlatch assemblies well known in the art.

Magnetic lock assembly 14 (with the exception of an infrared transparent window 28 which will be described later herein) can be of various sizes and strengths as is known in the prior art. In order to comply with most fire code regulations, magnetic lock assembly 14 is typically designed to operate from 12–24 volts AC/DC. An optional audio speaker 29 can also be provided.

In the prior art, in order for the magnetic lock assembly 14 and controlled deadlatch assembly 16 to operate properly in conjunction, it is necessary to hardwire the two assemblies through wires extending through door frame 12. However, by incorporating the electrical circuitry of FIG. 3 in controlled deadlatch assembly 16 and the electrical circuitry of FIG. 4 in magnetic lock assembly 14, all hard wiring between magnetic lock assembly 14 and controlled deadlatch assembly 16 can be eliminated.

Figure 3:
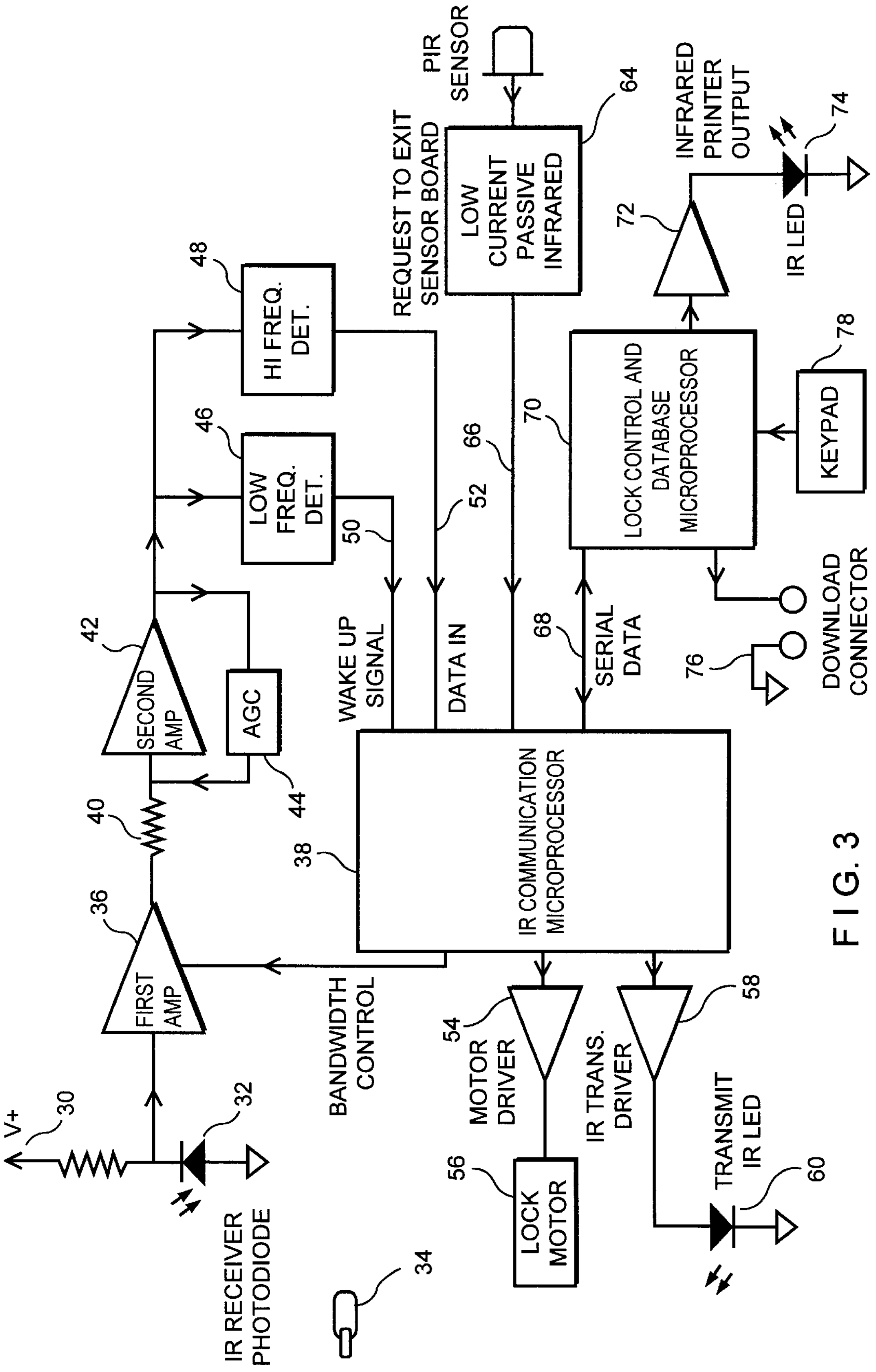
FIG. 3 is an electrical block diagram of the controlled deadlatch assembly portion of a two-point locking system incorporating the magnetic locking system in accordance with the present invention.

Referring to FIG. 3, a power supply 30 will be applied from the same battery incorporated to power controlled deadlatch assembly 16. An IR receiver photodiode 32 is incorporated which can receive signals from either magnetic lock assembly 14 (as described below) or a keyfob 34 which, in one embodiment, can be utilized as an input control device. A first amplifier 36, which is controlled by a bandwidth control signal from an infrared communication microprocessor 38, receives the electrical signal from receiver photodiode 32, passes its output through a resister 40 which, in turn, passes the signal through a second amplifier 42. Second amplifier 42 has an automatic gain control (ACG) feedback circuit 44 which is incorporated to prevent interference from other infrared signals, other locks, etc. Such ACG circuits are known in the prior art.

The output of second amplifier 42 is fed into both a low frequency detector 46 and a high frequency detector 48. Low frequency detector 46 provides a wake up signal output 50 to microprocessor 38. In essence, wake up signal output 50 prevents the unnecessary drain of power from power supply 30 and prepares infrared communication microprocessor 38 to receive data from high frequency detector 48 along a data input line 52.

Once infrared communication microprocessor 38 determines that the conditions and signals are proper to unlock the door, an output signal is generated to a motor driver 54 which in turn activates a lock motor 56. Lock motor 56 can be made to move deadlatch 22 to either a locked or unlocked position.

In order to also unlock magnetic lock assembly 14, a signal is also sent from infrared communication microprocessor 38 to an infrared transmitter 58 and on to an infrared transmitter 60. The infrared magnetic lock control signal transmitted from infrared transmitter 60 is capable of being received by magnetic lock assembly 14.

Still referring to FIG. 3, a PIR sensor 62 and a "request to exit" sensor board 64 is also shown connected to infrared communication microprocessor 38 along PIR data input line 66. This request to exit feature is typically incorporated inside the door and permits the unlocking of a door when PIR sensor 62 senses movement within a predetermined range of door 10. When a person moves within a predetermined proximity of door 10 on the inside, door 10 will unlock to permit that person to leave the premises. Optional request to exit techniques such as a push button, a "wiggle"

switch, a touch sensor switch, etc. may also be incorporated. A two-way serial data input/output line 68 is coupled between a lock control and database microprocessor 70 and infrared communication microprocessor 38 to either upload or download information. Audit trail information downloaded to lock control and database microprocessor 70 can be transmitted through an infrared transmitter driver 72 and then onto an infrared transmitter 74. Infrared transmitter 74 can provide information to an infrared printer output so that an installer can gather audit information. Alternatively, lock control and database microprocessor 70 can transmit audit trail information to a download connector 76 which can be directly coupled to a hand-held device to also receive audit trail information. A keypad 78 permits a user to modify the system by, for example, adding new users, changing permissible times of entry, adding new input control devices, etc.

Figure 4:
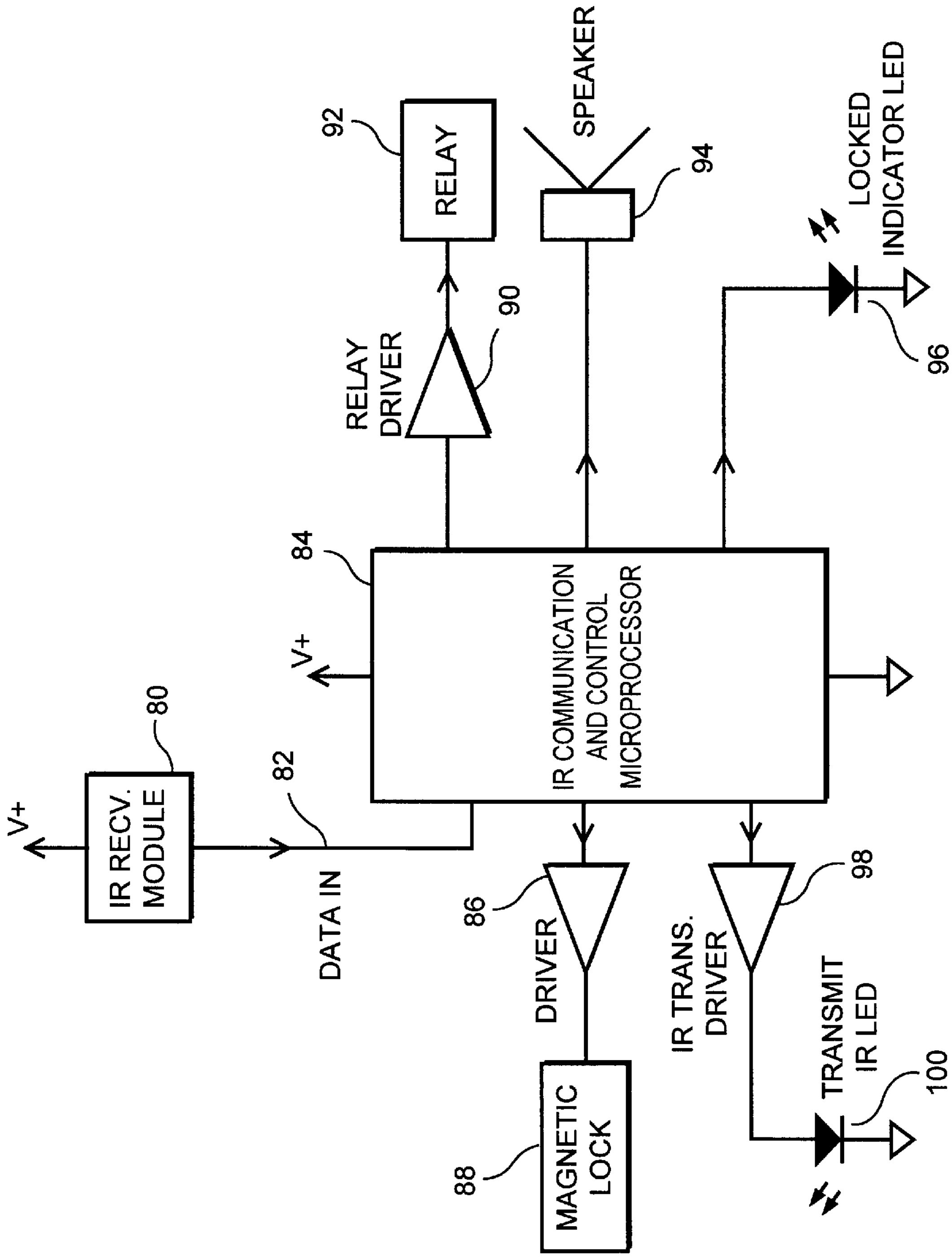
FIG. 4 is an electrical block diagram of the magnetic lock assembly portion of a two-point locking system incorporating the magnetic locking system in accordance with the present invention.

Turning now to FIG. 4, the circuitry associated with magnetic lock assembly 14 is shown. A powered infrared receiver module 80 is capable of receiving the transmitted infrared signal from infrared transmitter 60 which is part of controlled deadlatch assembly 16. The received data is transmitted along a data input line 82 to a magnetic lock communication and control microprocessor 84. After microprocessor 84 processes the received data, and in appropriate circumstances, a signal can be transmitted to a driver 86 to either activate or deactivate a magnetic lock 88. Infrared receiver module 80 can also receive signals from other transmitters besides infrared transmitter 60. For instance, a signal from keyfob 34 from outside door 10 can be received through infrared transparent window 28, as shown in FIG. 1. Magnetic lock 88 as shown in FIG. 4 can represent magnetic lock assembly 14 of FIG. 1 and FIG. 2.

Microprocessor 84 also can provide an output signal to a relay driver 90 and ultimately to a relay 92. Relay 92 can be incorporated to couple numerous other devices such as an alarm system. Microprocessor 84 can also be utilized to control a speaker 94 and/or a locked indicator LED 96.

Two—way wireless communication from magnetic lock assembly 14 to controlled deadlatch assembly 16 can also be provided by means of coupling microprocessor 84 to an infrared transmitter driver 98 and an infrared transmitter 100. Infrared transmitter 100 provides a control signal capable of providing information, including audit trail information, to infrared receiver photodiode 32 of FIG. 3. By incorporating the wireless communications between magnetic lock assembly 14 and controlled deadlatch assembly 16 in accordance with the present invention, numerous potential applications become possible. For instance, additional infrared transmitters for remote mounting can be provided to allow fixed remote release operations such as push buttons, or interfacing to existing release mechanisms. These transmitters can be capable of ceiling mounting for unobstructed communications with the locking system. These transmitters may be designed as relay units for use with shorter range devices such as a keyfob in order to expand their range; it will only be necessary for the keyfob signal to reach the remote transmitter for relaying the signal to the locking device. By utilizing this technique and further incorporating CCTV technology, a remotely located individual can release the locking mechanism upon seeing an individual whom access should be granted. Instead of CCTV, an audio-based intercom system might also be utilized. Additionally, with the use of two-way wireless communication, magnetic lock assembly 14 can be used to control the latching and unlatching of controlled deadlatch assembly 16 as opposed to the direction of control described in the preferred embodiment herein whereby initial control is at controlled deadlatch assembly 16.

Although the preferred embodiment has been described wherein controlled deadlatch assembly 16 includes a deadlatch 22, the deadlatch need not be incorporated. The wireless communication from the input control device can be transmitted to the magnetic lock without having any control over a deadlatch. The electrical assembly of the present invention also permits the incorporation of buzzers, door chimes, etc. as may be desired by the user and available in the prior art. In any embodiment, power wiring would be required only to the magnetic lock assembly to comply with standard fire codes.

It will be apparent from the foregoing description that the present invention provides a new and improved locking system which permits ease of installation and wireless communication between the magnetic lock assembly and the controlled deadlatch assembly. Many control input devices and desired audit trail information techniques can still be utilized.

While there has been shown and described what is presently considered to be the preferred embodiment of this invention, it will be obvious to those skilled in the art that various changes and modifications may be made without departing from the broader aspects of this invention. For instance, although the magnetic lock assembly has been shown incorporated on the top of a door frame, such magnetic lock assemblies can indeed be incorporated elsewhere on the door. Furthermore, while an infrared transparent window has been shown on the magnetic lock assembly, such an infrared transparent window can also be incorporated on the controlled deadlatch assembly to permit wireless communication from either side of the door. Moreover, although a standard door has been shown for illustrative purposes, any type of access door, gate, window, etc. can be protected by the locking apparatus of the present invention. Additionally, the term "deadlatch" as used herein shall include a dead bolt, another magnetic lock, a push button lock or any other locking means. It should also be noted that although microprocessors have been incorporated in the preferred embodiment based on ease of use, discreet logic components may be used.

It is, therefore, aimed in the appended claims to cover all such changes and modifications as fall within the true scope and spirit of the invention.

I claim:

1. A two-point locking system for providing controlled access through a door comprising:

- a controlled deadlatch assembly coupled to said door comprising:
  - a deadlatch for selectively latching and unlatching a door;
  - an input control device for selectively controlling said deadlatch; and
  - a first wireless transmitter for transmitting a magnetic and lock control signal; and
- a magnetic lock assembly coupled to said door comprising:
  - a housing unit;
  - an armature plate;
  - an electromagnetic element coupled to said housing unit and aligned to magnetically engage with said armature plate when selectively electrically energized; and
  - a first wireless receiver capable of receiving said magnetic lock control signal from said first wireless transmitter.

2. The locking system of claim 1 further comprising:

a second wireless transmitter coupled to said magnetic lock assembly for transmitting a control data signal from said magnetic lock assembly to said controlled deadlatch assembly; and a second wireless receiver coupled to said controlled deadlatch assembly for receiving said control data signal.

3. The locking system of claim 1 wherein said input control system is a control receiver for receiving a wireless control signal.

4. The locking system of claim 3 wherein said wireless control signal is sent by a keyfob.

5. The locking system of claim 3 further comprising a transparent window for infrared communication through said door.

6. The locking system of claim 1 wherein said first wireless transmitter is an infrared light emitting diode.

7. The locking system of claim 1 wherein said first wireless receiver is an infrared photodiode.

8. The locking system of claim 2 wherein said second wireless transmitter is an infrared light emitting diode.

9. The locking system of claim 2 wherein said second wireless receiver is an infrared photodiode.

10. A two-point locking system for providing controlled access through a door comprising:

a first lock assembly coupled to, and capable of selectively securing and releasing, said door;

a second lock assembly coupled to, and capable of selectively securing and releasing, said door;

an input control device coupled to said first lock assembly for entering data indicative of whether said door should be secured or released;

processing means coupled to said input control device for converting said data to a first signal for selectively securing and releasing said first lock assembly and a second signal for selectively securing and releasing said second lock assembly;

a first wireless transmitter coupled to said first lock assembly for transmitting said second signal; and a first wireless receiver coupled to said second lock assembly for receiving said second signal.

11. The locking system of claim 10 wherein said second lock assembly is a electromagnetic lock assembly.

12. The locking system of claim 10 wherein said first signal selectively secures said first lock assembly and said second signal selectively secures said second lock assembly.

13. The locking system of claim 10 wherein said first signal selectively releases said first lock assembly and said second signal selectively releases said second lock assembly.

14. The locking system of claim 10 wherein said first wireless transmitter is an infrared light emitting diode.

15. The locking system of claim 10 wherein said first wireless receiver is an infrared photodiode.

16. The locking system of claim 10 wherein said processing means is a microprocessor.

17. The locking system of claim 10 further comprising:

a second wireless transmitter coupled to said second lock assembly for transmitting a control data signal from said second lock assembly to said first lock assembly; and a second wireless receiver coupled to said first lock assembly for receiving said control data signal.

18. The locking system of claim 17 wherein said second wireless transmitter is an infrared light emitting diode.

19. The locking system of claim 17 wherein said second wireless receiver is an infrared photodiode.

20. A method for controlling the operation of a two-point locking system comprising a first lock assembly and a second lock assembly for providing controlled access through a door comprising the steps of:

inputting data to a first input control device associated with said first lock assembly, said data being indicative of whether said door should be secured or released;

converting said data to a first signal for selectively securing and releasing said first lock assembly and a second signal for selectively securing and releasing said second lock assembly;

transmitting said second signal from said first lock assembly to said second lock assembly by means of an electromagnetic signal; and receiving said electromagnetic signal at said second lock assembly.

21. The method of claim 20 further comprising the steps of:

transmitting an electromagnetic control data signal from said second lock apparatus; and receiving said electromagnetic control data signal at said first lock assembly.

* * * * *